United States Patent
Buehring

(10) Patent No.: US 11,408,981 B2
(45) Date of Patent: Aug. 9, 2022

(54) METHOD OF LIDAR SCANNING

(71) Applicant: Red Sensors Ltd, Leicester (GB)

(72) Inventor: Ian Buehring, Leicester (GB)

(73) Assignee: RED SENSORS LTD, Leicester (GB)

( * ) Notice: Subject to any disclaimer, the term of this patent is extended or adjusted under 35 U.S.C. 154(b) by 785 days.

(21) Appl. No.: 16/385,124

(22) Filed: Apr. 16, 2019

(65) Prior Publication Data

US 2019/0324122 A1   Oct. 24, 2019

(30) Foreign Application Priority Data

Apr. 18, 2018 (GB) ..................................... 1806318

(51) Int. Cl.
*G02B 26/10* (2006.01)
*G01S 7/481* (2006.01)

(52) U.S. Cl.
CPC .......... *G01S 7/4817* (2013.01); *G02B 26/101* (2013.01); *G02B 26/108* (2013.01)

(58) Field of Classification Search
CPC ...... G01S 7/4817; G01S 7/4815; G01S 17/89; G02B 26/101; G02B 26/108; G02B 5/04; G02B 26/10
See application file for complete search history.

(56) References Cited

U.S. PATENT DOCUMENTS 10,295,659 B2 * 5/2019 Wang ..................... G01C 3/08
2018/0062345 A1 * 3/2018 Bills .................. G02B 26/0816

FOREIGN PATENT DOCUMENTS

EP     3187895 A1    7/2017

OTHER PUBLICATIONS

Search and Examination Report, GB 1806318.0 dated Sep. 28, 2018.

* cited by examiner

*Primary Examiner* — Euncha P Cherry
(74) *Attorney, Agent, or Firm* — Daniel J. Chalker; Edwin S. Flores; Chalker Flores, LLP

(57) ABSTRACT

A method of lidar scanning over a rotational range provides a dense scanning pattern over the entire rotational range without the need for complex control of components. The method comprises rotating an angled scanning mirror at a first angular velocity about an axis of rotation; rotating a first diffractive or refractive optical element at a second angular velocity about the axis of rotation; controlling a stationary laser source to emit light along an emission beam path that passes through the first diffractive optical element before being incident upon the scanning mirror in order to reflect said light onto a scanning beam path; and detecting light reflected from external objects present in the scanning beam path.

21 Claims, 8 Drawing Sheets

METHOD OF LIDAR SCANNING

CROSS-REFERENCE TO RELATED APPLICATIONS

This application claims priority to GB Application Serial No. 1806318.0, filed Apr. 18, 2018, the entire contents of which are incorporated herein by reference.

TECHNICAL FIELD OF THE INVENTION

The present invention relates to lidar scanning. In particular, the present invention provides an improved lidar method that provides dense scanning over a field of view, preferably 360°, without requiring the rotation or movement of any component of an apparatus other than a scanning mirror and one or more diffractive or refractive optical elements.

STATEMENT OF FEDERALLY FUNDED RESEARCH

None.

INCORPORATION-BY-REFERENCE OF MATERIALS FILED ON COMPACT DISC

None.

BACKGROUND OF THE INVENTION

In lidar scanning systems light is used to measure the distance to nearby objects and thereby provide a scan of the nearby environment. Many lidar systems are time of flight lidar systems in which the time that it takes a pulse of light to be reflected from an object and returned to a receiver after it has been emitted is used to calculate the distance the object is from a scanner. Alternative lidar systems use amplitude or phase modulation beam range finding, rather than utilising pulses of light. Typically, lidar scanning generates a 3D point cloud model of the immediate surroundings. It is anticipated that this technology will be of increasing importance in coming years, particularly for use with self-driving vehicles in which accurate and rapid detection of moving objects is of paramount importance. Other uses for the technology include robotics, collision avoidance systems, mapping technology, and security systems.

U.S. Pat. No. 5,455,669 (Wetteborn) discloses a typical time of flight scanning lidar apparatus according to the closest prior art to the present invention. In this apparatus a pulsed laser emits light pulses along an emission beam path onto a rotating mirror. The mirror is rotated about an axis of rotation that is coincident with the emission beam path. In this way, as the mirror rotates a pulsed beam is scanned in a detecting plane about the apparatus. Generally, the apparatus is arranged such that the plane that is scanned is horizontal and the emission beam path is vertical. This is achieved by angling the mirror at 45° to the vertical emission beam path. Light is reflected back from objects located in the detecting plane onto the mirror where it is reflected back through a receiving lens, the optical axis of which is coincident with the emission beam path, such that it is focused on a detector. This allows the calculation of the proximity of objects located in the detecting plane. In particular, the proximity of an object can be calculated based on the time at which a pulse of light was emitted, the instantaneous rotational angle of the mirror, and the time at which the returned light is detected by the detector. The apparatus of Wetteborn produces a 2D point cloud model of its surrounding within the detecting plane.

FIG. 1 shows the general concept of the lidar scanner 1 disclosed in Wetteborn. A laser source 2 having a collimating lens produces a laser beam that is directed onto a 45° mirror 3 such that it follows a vertical emission beam path 4 after being reflected off the 45° mirror. The emission beam 4 path passes through a central aperture 5 formed in a horizontally oriented receiving lens 6 and is incident on a scanning mirror 7. The scanning mirror 7 reflects the laser beams along a scanning beam path 8. In use, the scanning mirror 7 is rotated about an axis of rotation that is coincident with the emission beam path 4 so as to scan the scanning beam path 8 either around a circular path or around an arc that forms part of that path. When the laser of the scanning beam path is incident upon an external object at least a portion of the laser light will be reflected back onto the scanning mirror 7 and thereby reflected back down through the receiving lens 6. The receiving lens 6 is formed to focus all such reflected laser light onto a stationary detector 9 positioned on the axis of rotation of the scanning mirror 7. That is, the optical axis of the receiving lens 6 is coincident with the axis of rotation of the scanning mirror 7.

Generally, the laser source 2 of the scanner 1 of FIG. 1 is controlled to emit pulses of laser light. By measuring the time taken from the emission of a pulse of laser light by the laser source 2 to the detection of reflected laser light of that pulse by the detector 9 the distance to the object from which the light was reflected can be calculated. If the angle of rotation of the rotating mirror at that moment is also known the location of the object can be determined. In this manner the lidar scanner 1 of Wetteborn can produce a 2D point cloud map of a scanned plane.

A major drawback with the apparatus of Wetteborn is that it can only scan either a plane or a cone around the apparatus depending on the angle of the beam path exiting the apparatus. It would be advantageous if a lidar scanning apparatus could scan the surroundings in another manner without the need for complex control of the scanning mirror. Further the apparatus of Wetteborn is not capable of producing a full 3D cloud map of the surrounding volume without actuation of the device body. Scanning in 3D is of vital importance for many systems, particularly self-driving cars.

In light of the problem with the disclosure of Wetteborn, many alternative and 3D time of flight lidar systems have been developed. For example, U.S. Pat. No. 7,969,558 (Hall 1) and U.S. Pat. No. 8,767,190 (Hall 2) disclose complex 3D lidar systems. In particular, these apparatus generally comprise a plurality of linear lidar sensors that are positioned to detect along emission paths that are each at different angles. These linear lidar sensors are then rotated about a central vertical axis to produce a 3D point cloud model of the surrounding area.

The systems of Hall 1 and Hall 2 are complex in that they require the rotation of the linear lidar systems themselves. This results in complex technical issues as the power supply, control signals, and output signals are all required to be transmitted through a rotating coupling. Further, the components of the systems are subject to significant rotational forces.

The problems set out above exist for all prior art lidar scanners. This includes but is not limited to time of flight lidar scanners, phase modulation lidar scanners, and amplitude modulation lidar scanners.

The present applicant has previously proposed in application GB1620503.1 a lidar scanning apparatus comprising:

a receiving lens having an optical axis; a scanning mirror angled to the optical axis of the receiving lens and controlled to rotate about a scanning axis; a stationary laser source that is positioned to emit light along an emission beam path that is reflected by the scanning mirror along an associated scanning beam path; a detector associated with the laser source and positioned to receive light from said laser source that is reflected by external objects and returned through the receiving lens and via the scanning mirror; characterized in that: the emission beam path is located at an angle to the scanning axis. in which the laser source is held stationary and the only component that is moved is an angled mirror upon which an emission beam path is incident.

In this apparatus, the only part that is required to move is the scanning mirror that is controlled to rotate about a scanning axis. The apparatus can provide good scanning over a 360° angular range. However, to provide detailed scanning it is generally required that the apparatus of GB1620503.1 comprises a plurality of laser sources or that a beam from a single laser source is split into several beams, each having a different scanning beam path. Therefore, there is a need for an improved lidar scanning method that can utilise an apparatus according to GB1620503.1 to provide good scanning over a 360° angular range with a reduced number of scanning beam paths. Preferably the method should be capable of providing detailed scanning over a 360° angular range using only a single scanning beam path.

U.S. Pat. No. 8,665,122 (JK Vision) describes a lidar scanning apparatus for a maritime vessel in which an angled mirror and two wedge prisms are mounted to all be rotatable around a common axis of rotation and are used to control the emission beam path of a single laser source. When in use the apparatus of JK Vision is precisely controlled to provide a rastered scanning of an area of sea ahead of a vessel. See for example, FIG. 2 which sets out the emission beam path when the apparatus is in use. This scanning path is essential to allow the apparatus to detect wave height and the height of objects relative to the sea level. The precise control involves carefully and precisely controlling the angle of rotation of an angled scanning mirror (47) and first and second refracting optical elements (45, 46). As will be readily understood the control of this scanning is extremely complex and thus undesirable in most situations.

In light of the above, there is a need for a method of lidar scanning that can provide detailed 360° scanning in a simple manner using minimum components.

SUMMARY OF THE INVENTION

The present invention provides a method of lidar capable of scanning over a 360° rotational range comprising: rotating an angled scanning mirror at a first angular velocity about a first axis of rotation; rotating a first diffractive or refractive optical element (DROE) at a second angular velocity about a second axis of rotation; controlling a stationary laser source to emit light along an emission beam path that passes through the first DROE before being incident upon the scanning mirror in order to reflect said light onto a scanning beam path; and detecting light reflected from external objects present in the scanning beam path.

The present invention is advantageous in that it provides a method of lidar scanning that can use one, or only a few, laser sources emitting light along one, or only a few, emission beam paths, to provide detailed scanning. This scanning can be over a complete 360° rotational range or any part thereof. This can be achieved with the minimum of moving components, said moving components only requiring simple control to be rotated. This overcomes problems with the prior art in which a plurality of emission beam paths and/or precise control of moving components is required.

Preferably, the method of the present invention is carried out over a 360° rotational range but it can also be carried out over only a part of that range, for example 270°, 180° or 90° or any other suitable range. Scanning of a part of the range can be achieved in any manner apparent to the person skilled in the art. For example it could be achieved by rotationally reciprocating rotating components over the part of the range and/or it can be achieved by forming an apparatus such that the emission beam path is only formed over the part of the rotational range and/or it can be achieved by forming an apparatus such that only light reflected from the part of the rotational range is detected. This can be achieved The first angular velocity can be either constant or variable. Similarly, the second angular velocity can be either constant or variable. In simple embodiments of the invention both the first angular velocity and the second angular velocity are constant. These embodiments may be preferred as controlling components to rotate at constant rates is particularly simple. However, in alternatively embodiments varying the first angular velocity and/or the second angular velocity may be advantageous.

The first axis of rotation may be coincident with the second axis of rotation. This may be preferred as it provides a simple construction. In alternative embodiments the first axis of rotation may be displaced from but parallel to the second axis of rotation. In further alternative embodiments the first axis of rotation may be at an angle to the second axis of rotation.

The method of the present invention can achieve detailed scanning over a 360° angular range by utilising one or more DROEs in conjunction with a scanning mirror. A DROE is any optical element that acts to diffract or refract an incident beam through a deviation. Typically a DROE will act to diffract or refract an incident beam through a fixed and constant deviation angle, although DROEs with a variable angle of diffraction could also be used with the method of the present invention. An example of a common DROE is a wedge prism that acts to refract a beam through a fixed deviation angle. A further example of a common DROE is a diffraction grating that acts to diffract a beam through a fixed deviation angle. A further example of a suitable DROE is a Fresnel prism.

The method of the present invention operates in the following manner. The angled mirror is rotated about the first axis of rotation at a first angular velocity. The DROE is rotated about the second axis of rotation at a second constant velocity. Advantageously the DROE will be rotated in the opposite direction to the angled mirror. Further, as explained in further detail below, it is advantageous that the second angular velocity is different to the first angular velocity and that they are not integer multiples of one another. This ensures that a denser scan can be achieved by a single beam. It is even more preferable that the ratio of the second angular velocity to the first angular velocity is irrational as this could lead to a substantially infinite scanning density over unlimited revolutions of the relevant components. This is particularly true if both the first angular velocity and the second angular velocity are constant.

Providing that the first angular velocity is not always exactly equal to the second angular velocity the method of the present invention results in the emission beam path of a single beam scanning a much denser pattern over repeated rotations of the mirror over a 360° angular range as compared to a method utilising an apparatus having only a rotating angled mirror. The scanning density can be controlled by controlling the first angular velocity and the second angular velocity in an appropriate manner.

In order to further improve the scanning density and the scanning area that can be achieved by the method according to the present invention it may be preferable that the method further comprises: rotating a second DROE at a third angular velocity about a third axis of rotation, wherein the second DROE is located between the first DROE and the scanning mirror and the emission beam path passes through the second DROE before being incident upon the scanning mirror.

The third axis of rotation may be coincident with or parallel to the first axis of rotation and/or the second axis of rotation. Alternatively, the third axis of rotation may not be parallel to either the first axis of rotation or the second axis of rotation. In a particularly simple embodiment of the invention the third axis of rotation is coincident with both the first axis of rotation and the second axis of rotation.

As for the first angular velocity and the second angular velocity, the third angular velocity may be constant or may be variable. The third constant angular velocity may be controlled to be equal to the second constant angular velocity or may be different thereto. The second DROE may be rotated about the third axis of rotation in the opposite direction to the first DROE diffractive optical element or in the same direction.

Utilising a second DROE can act to increase the scanning area as a beam can now be deviated twice before being incident upon the scanning mirror. This can result in a much greater angle of deviation before a beam is incident on the scanning mirror thereby greatly increasing the maximum possible height of the scanning area.

The DROEs of the present invention may be any suitable optical element that acts to diffract or refract an incoming beam through a known deviation angle. The, or each, DROE may have a deviation angle of θ. If the method utilises more than one DROE element then said elements may have the same deviation angle or they may have different deviation angles. In embodiments of the invention the, or each, DROE may be a wedge prism.

The deviation angle θ of the or each DROE may be between 1° to 15°. The deviation angle θ of the or each diffractive optical element may be between 5° and 10°. These deviation angles are preferred as they are simple to achieve and allow a good scanning area and scanning density to be achieved. For example, if two DROEs are used, each with a deviation angle of 8°, a maximum azimuthal deviation of ±16° may be achieved.

In order to provide a good scanning density it may be preferable that the second angular velocity has a magnitude that is at least ten times the first angular velocity. It may also be preferable that the second angular velocity is less than fifty times the first angular velocity. In embodiments of the invention the second angular velocity may be approximately, but not exactly, twenty times the first angular velocity, for example the second angular velocity may be controlled to be 20.25 times the first angular velocity.

As an alternative, in order to provide an improved scanning density it may be preferable that the first angular velocity has a magnitude that is at least ten times the second angular velocity. It may also be preferable that the first angular velocity is less than fifty times the second angular velocity. In embodiments of the invention the first angular velocity may be approximately, but not exactly, twenty times the second angular velocity, for example the first angular velocity may be controlled to be 20.25 times the second angular velocity.

As the method of the present invention utilises both a DROE and an angled scanning mirror the method of the present invention can be utilised to produce adequate scanning density with apparatus wherein the emission beam path is coincident with the first and/or the second axis of rotation. However, in embodiments of the invention it may be preferable that the emission beam path is parallel but displaced from the first and/or the second axis of rotation. In further embodiments it may be preferable that the emission beam path is at an angle to the first and the second axis of rotation.

The method of the present invention may be used with apparatus comprising a plurality of stationary laser sources each controlled to emit light along an emission beam path that passes through the first DROE before being incident upon the scanning mirror in order to reflect said light onto a scanning beam path. If the method of the present invention is used with apparatus comprising a plurality of laser sources and/or emission beam paths then said emission beam paths may be a combination of any of the orientation possibilities described immediately above. Utilising multiple laser sources (either split from one or more laser generating sources or each produced by an individual laser generating source) may be advantageous as it can allow a denser scan to be produced.

The emission beam path of the or each laser source in the method of the present invention may be in any suitable orientation, depending on the specific construction of an apparatus operating according to the method. For example, the emission beam path from any specific laser source may pass through the centre of a receiving lens before being incident upon a DROE and/or the angled scanning mirror (for example by passing through a suitably shaped portion of the receiving lens or through a hole formed therein). Alternatively any emission beam path may pass to the side of a receiving lens before being incident upon a DROE and/or the angled scanning mirror. As a further alternative, any laser source may be positioned between a receiving lens and the angled scanning mirror such that the emission beam paths do not need to pass through or by the receiving lens.

The angled scanning mirror of the present invention may be any suitable scanning mirror. In preferred embodiments of the invention the angled scanning mirror may be a planar mirror angled at 45° to the axis of rotation.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not limit the invention, except as outlined in the claims.

Figure 1:
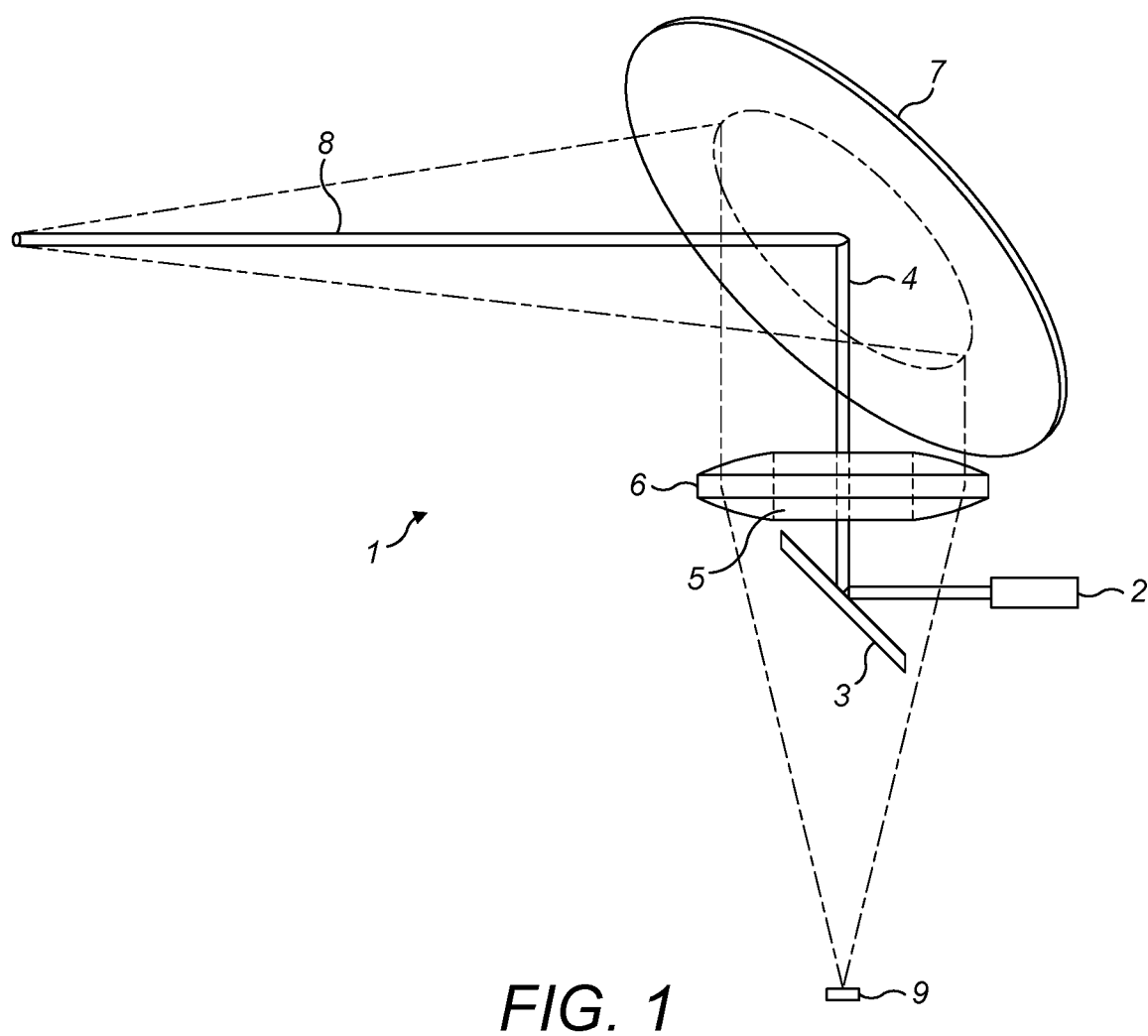
FIG. 1 shows an apparatus according to the prior art.
Figure 2:
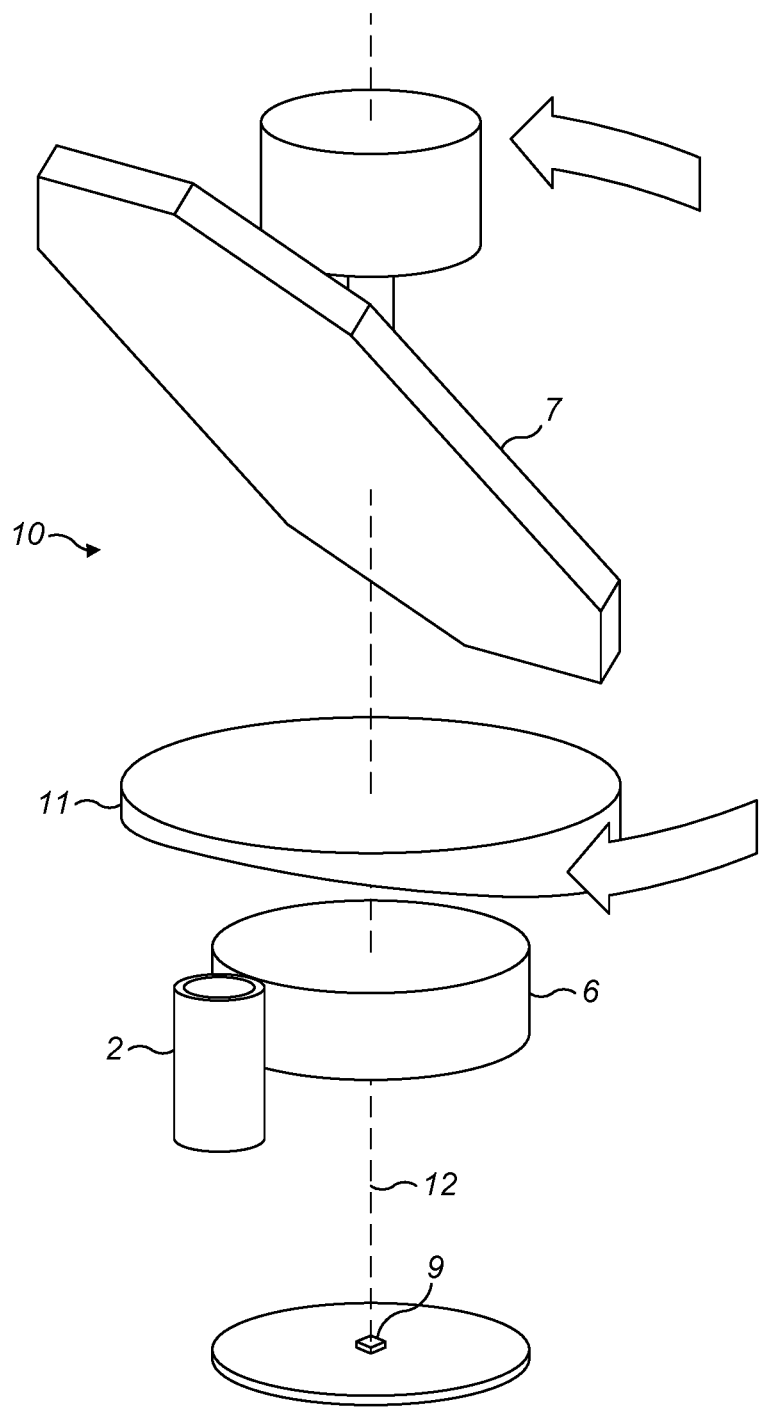
FIG. 2 shows a first embodiment of an apparatus suitable for use with the method of the present invention.

An apparatus 10 suitable for use with the method of the present invention is shown in FIG. 2. The apparatus 10 is generally similar to the apparatus 1 according to the prior art shown in FIG. 1 and described above. For that reason the same reference numerals have been used to refer to the components of the apparatus 1 of FIG. 1 where appropriate.

The apparatus 10 comprises a vertically oriented laser source 2 having a collimating lens that produces a laser beam (not shown). The apparatus 10 has a horizontally oriented receiving lens 6, a wedge prism 11 and a scanning mirror 7, and a stationary detector 9. The receiving lens 6, wedge prism 11, scanning mirror 7, and stationary detector 9 are all located on an axis of rotation 12. The laser source 2 is located to a side of the receiving lens and emits a laser beam along a path that is parallel to but displaced from the axis of rotation 12. The laser beam passes through the wedge prism 11 before being incident on the scanning mirror 7, the laser beam does not pass through the receiving lens 6. The scanning mirror 7 and the wedge prism 11 are mounted so as to be rotatable about the axis of rotation 12, all other components are stationary. The apparatus 10 can be operated using the method of the present invention in the manner set out below.

The scanning mirror 7 is rotated about the axis of rotation 12 in a first direction at a first constant angular rate. The wedge prism 11 is rotated about the axis of ration is a second direction that is opposite to the first direction and at a second constant angular rate. The laser source 2 is operated to emit a laser beam in a conventional manner. The laser beam passes through the wedge prism 11 is incident upon the scanning mirror 7 and is thereby reflected onto the surrounding environment. The laser beam will then be reflected by the surrounding environment back onto the scanning mirror 7 wherein it is reflected back through the wedge prism 11, through the receiving lens 6 and onto the detector 9. In this manner, the apparatus 10 operates as a lidar scanner in a substantially conventional manner.

Figure 3:
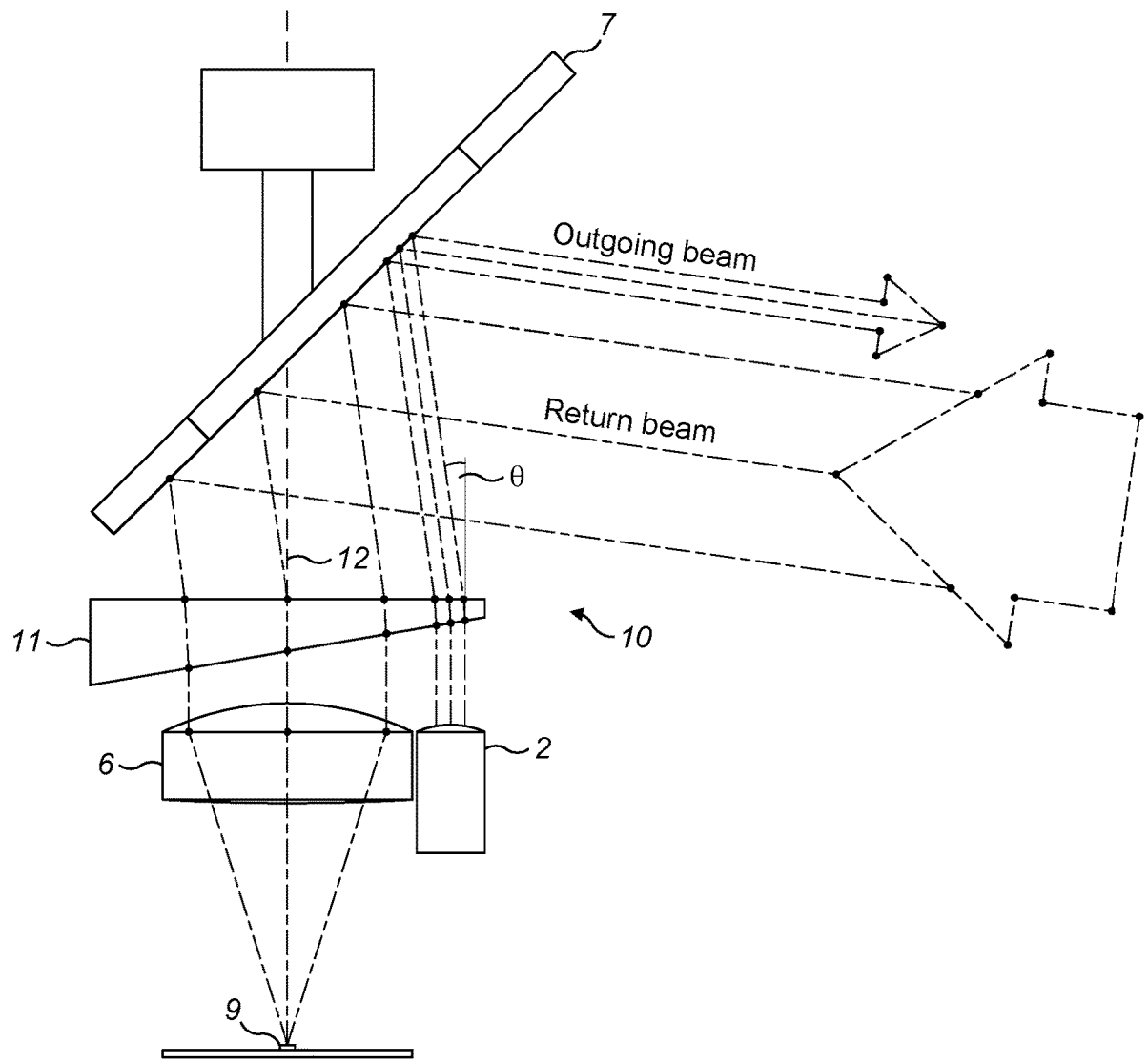
FIG. 3 shows the beam paths of the apparatus of FIG. 2 in a rotational position.

As the scanning mirror 7 is rotated at a first constant rate, the apparatus 10 will scan through a complete 360° angular range. The wedge prism 11 acts to deviate the laser beam from a path parallel to, but displaced from, the axis of rotation through an angle of θ. Said angle being a characteristic of the wedge prism 11 and may, for example, be approximately 8°. The angular direction relative to the axis of rotation 12 in which the laser beam is deviated by angle θ is dependent upon the rotational position of the wedge prism 11 at the moment at which the beam passes through the wedge prism. The scanning mirror 7 will act to reflect a laser beam incident upon it through an angle of 90°. The angular direction relative to the axis of rotation 12 in which the beam is reflected is dependent upon the rotational position of the scanning mirror 7 at the moment the beam is incident upon the scanning mirror 7. In this manner the precise direction in which a laser beam is directed out of the apparatus 10 at any particular moment is dependent upon the substantially instantaneous rotational positions of the wedge prism 11 and the scanning mirror 7. This instantaneous deviation is shown in FIG. 3.

As a result of the beam deviation described above and shown in FIG. 3, controlling the scanning mirror 7 to rotate in the first direction at the first constant angular rate and controlling the wedge prism 11 to rotate in the second direction at the second constant angular rate results in a controlled scanning pattern through a complete 360° angular range with a maximum azimuthal deviation of ±θ. By controlling both the first constant angular rate and the second constant angular rate appropriately a dense scanning pattern can be achieved. Scanning patterns that can be achieved by the method of the present invention using the apparatus of FIGS. 2 and 3 are shown in FIGS. 4 and 5.

Figure 4:
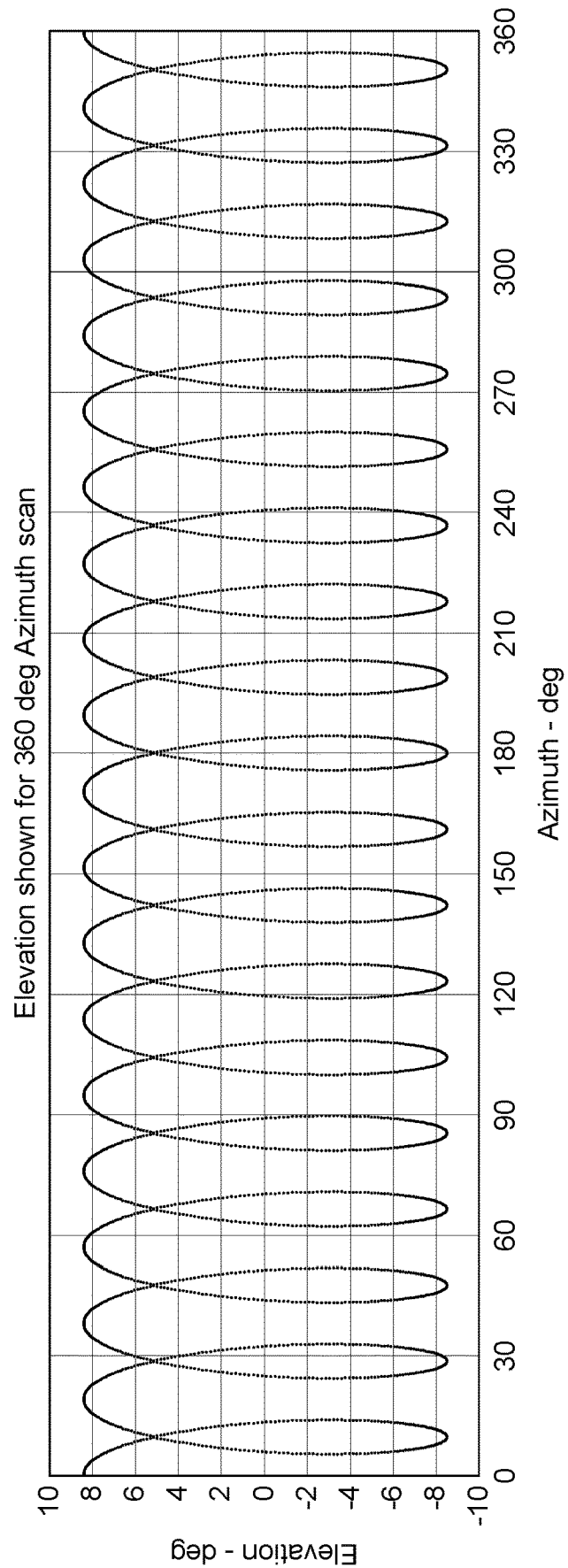
FIG. 4 is a trace of the emission beam path of the apparatus of FIGS. 2 and 3 when used with a first embodiment of the method of the present invention.

In FIG. 4 the scanning pattern achieved through a rotational angle of 360° using the apparatus 10 is shown wherein the second constant angular rate is 20× the first constant angular rate. The elevation angle of the scan varies by ±θ as the wedge prism 11 is rotated. As the second constant angular rate is an integer multiple of the first constant angular rate the same scanning pattern is traced over each revolution of the scanning mirror 7.

Figure 5:
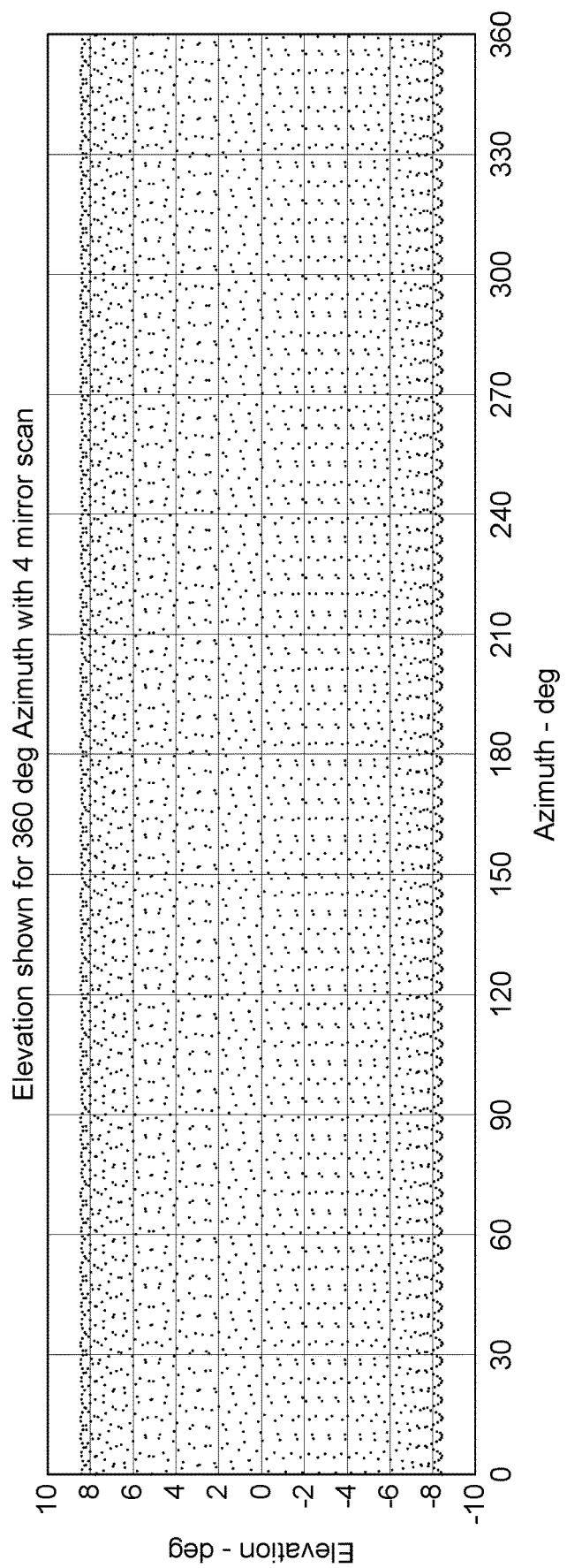
FIG. 5 is a trace of the emission beam path of the apparatus of FIGS. 2 and 3 when used with a second embodiment of the method of the present invention.

FIG. 5 shows an alternative scanning pattern that is achieved through a rotational angle of 360° over four rotations using the apparatus 10 wherein the second constant angular rate is 20.25× the first constant angular rate. The elevation angle of the scan varies by ±θ as the wedge prism 11 is rotated. As can be clearly seen by controlling the second constant angular rate not to be an integer multiple of the first constant angular rate a denser scanning pattern is achieved.

Figure 6:
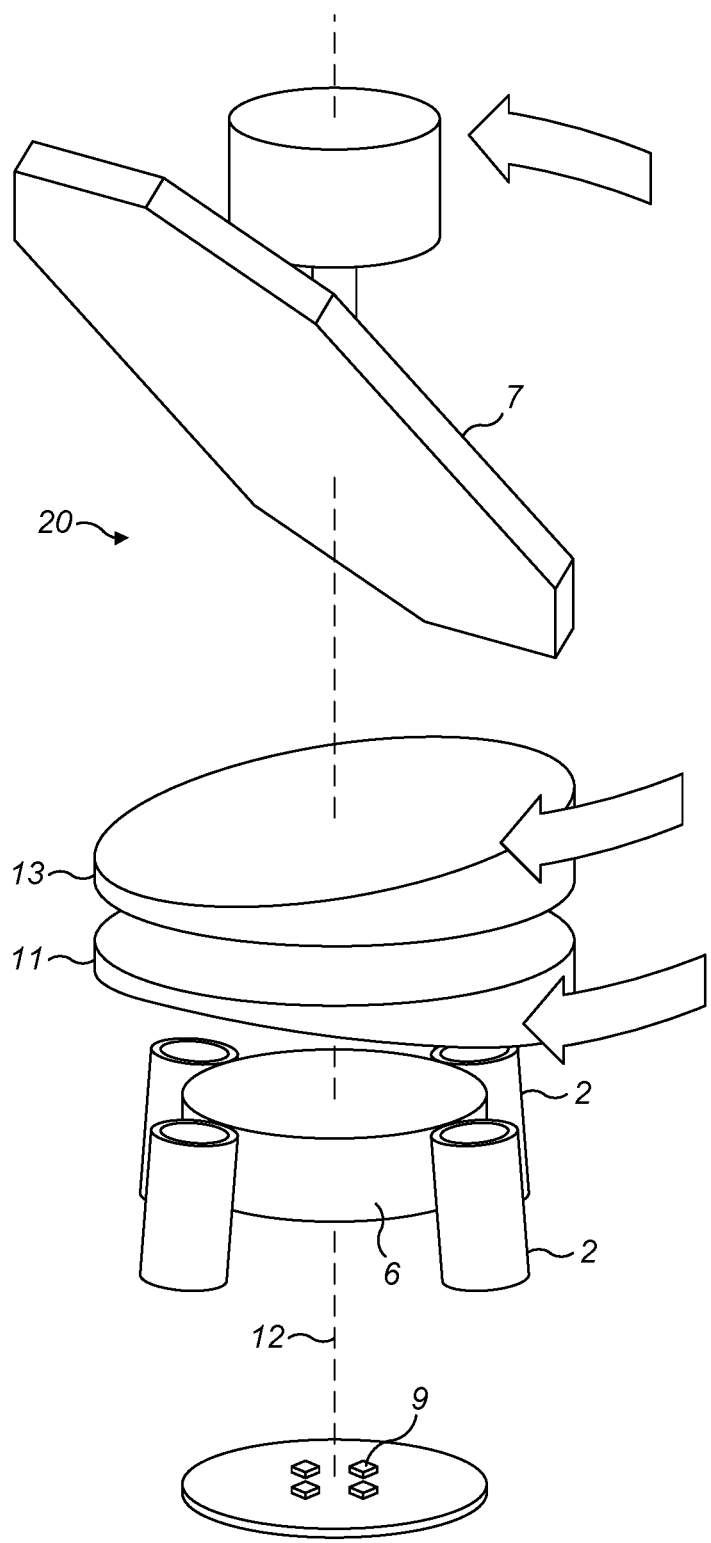
FIG. 6 shows a second embodiment of an apparatus suitable for use with the method of the present invention.

FIG. 6 shows an alternative apparatus 20 for use with the method of the present invention. The apparatus 10 is generally similar to the apparatus 1 according to the prior art shown in FIG. 1 and described above and the apparatus 10 shown in FIGS. 2 and 3 and described above. For that reason the same reference numerals have been used to refer to the components of the apparatus 1, 10 of FIGS. 1, 2 and 3 where appropriate.

The apparatus 20 differs from the apparatus 10 in that it comprises four laser sources 2, rather than a single laser source, four detectors 9, one for each laser source 2, and in that it comprises a second wedge prism 13 located immediately above the wedge prism 11 so as to be rotatable about the axis of rotation 12. The four laser sources 2 are each oriented to produce a laser beam that is at an angle to the axis of rotation 12 and so that the laser beams pass through the wedge prism 11, the second wedge prism 13, and are incident upon the scanning mirror 7. After reflection from the surrounding environment the laser beams reflect back off the scanning mirror 7, through the second wedge prism 13, the wedge prism 11, and the receiving lens 6, and are detected by a detector 9 associated with the relevant laser source 2.

When the apparatus 20 is operated according to the method of the present invention the scanning mirror 7 is rotated about the axis of rotation 12 in a first direction at a first constant angular rate, the wedge prism 11 is rotated about the axis of rotation 12 in a second direction at a second constant angular rate, and the second wedge prism 13 is rotated about the axis of rotation 12 in the second direction at a third constant angular rate.

As will be readily understood, using four laser sources 2 each at a different orientation relative to the axis of rotation 12, rather than a single laser source, results in a scanning pattern that is four times as dense.

The use of a second wedge prism 13 increases the elevation of the scan that can be achieved as compared to the use of a single wedge prism. In particular a beam passing through both the wedge prism 11 and the second wedge prism 13 can be deflected by an angle of up to 20 and the elevation angle of the scanning pattern can be controlled accordingly.

Figure 7:
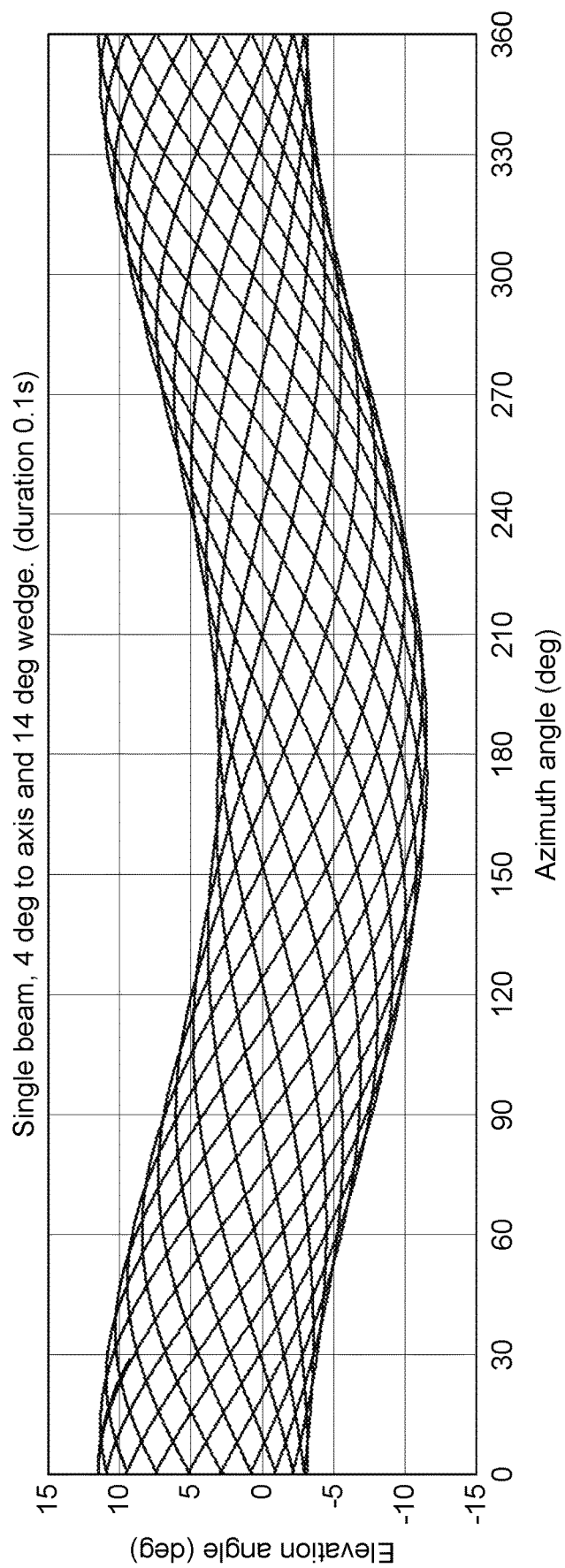
FIG. 7 is a scan pattern for the apparatus of FIG. 2 over 0.1 s when used with an embodiment of the method of the present invention.

FIG. 7 shows the scanning pattern achieved by the apparatus 10 of FIG. 2 having a single laser source 2. The scanning pattern of FIG. 7 is shown over a time period of 0.1 s wherein the first constant angular rate is about 20× the second constant angular rate and the second constant angular rate is 10 revolutions per second; that is the scanning mirror 7 is rotated at about 20× the speed of the wedge prism 11 and completes about 200 revolutions per second. In particular, FIG. 7 shows a plot over 0.1 s wherein the angled mirror 7 has rotated about 20 times and the wedge prism has rotated once. As will be readily appreciated, the overall shape of this scanning pattern is determined by the angle of the emission beam path to the axis of rotation 12 and the deviation angle of the wedge prism 11.

Figure 8:
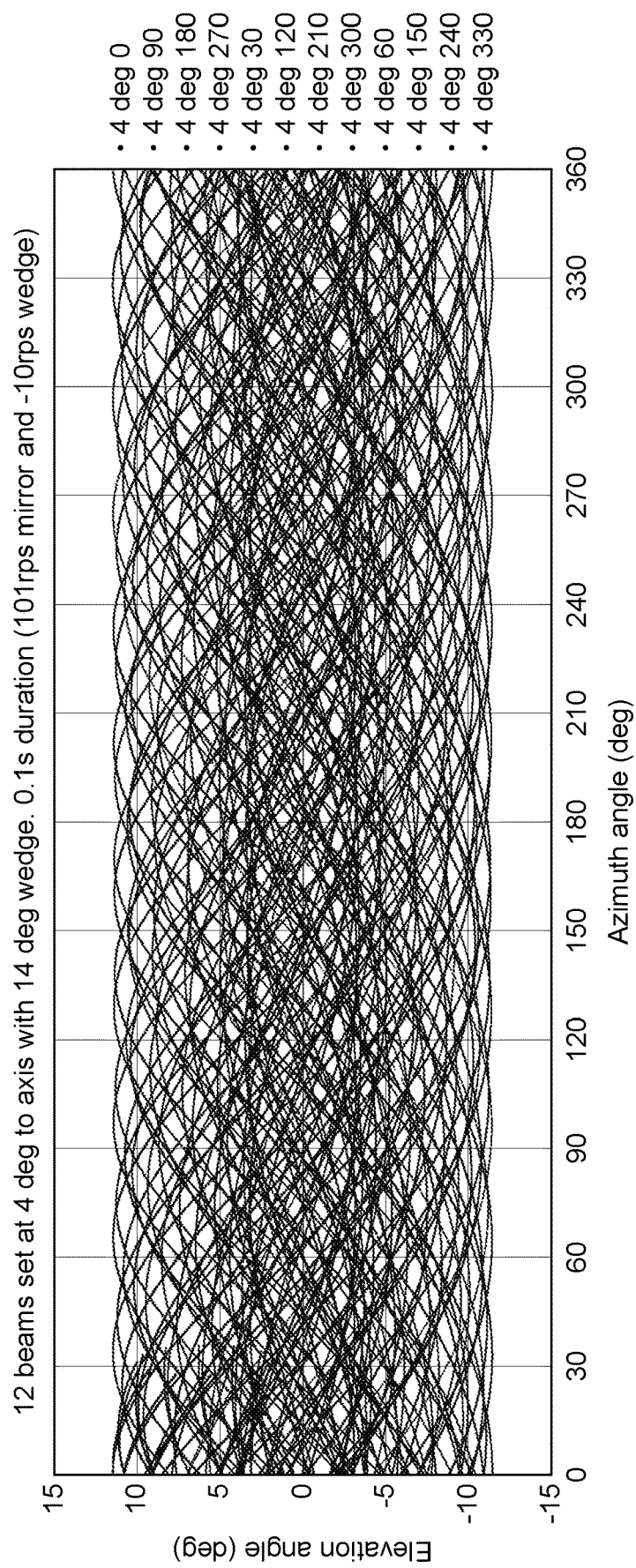
FIG. 8 is scan pattern for an alternative apparatus over 0.1 s when used with an embodiment of the method of the present invention.

FIG. 8 shows the scanning pattern achieved from the an apparatus substantially as shown in FIG. 2 but having twelve, instead of one, laser sources 2. The laser sources 2 are equally spaced about the receiving lens 6 and are substantially stationary. In the scanning pattern of FIG. 8 the first constant angular rate is 101 revolutions per second and the second constant angular rate is 10 revolutions per second. The scanning pattern is shown over a time period of 0.1 s. As can be seen, the scanning pattern is particularly dense over the scanning area. If it were desired to scan some of the voids in the scanning pattern this could be done by simply varying the first angular rate and/or the second angular rate appropriately.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), property(ies), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

To aid the Patent Office, and any readers of any patent issued on this application in interpreting the claims appended hereto, applicants wish to note that they do not intend any of the appended claims to invoke paragraph 6 of 35 U.S.C. § 112, U.S.C. § 112 paragraph (f), or equivalent, as it exists on the date of filing hereof unless the words "means for" or "step for" are explicitly used in the particular claim.

What is claimed is:

1. A method of lidar scanning over a rotational range comprising:
    rotating an angled scanning mirror at a first angular velocity about a first axis of rotation;
    rotating a first diffractive or refractive optical element at a second angular velocity about a second axis of rotation;
    controlling a stationary laser source to emit light along an emission beam path that passes through the first diffractive or refractive optical element before being incident upon the scanning mirror in order to reflect said light onto a scanning beam path; and
    detecting light reflected from external objects present in the scanning beam path.

2. The method according to claim 1, wherein the rotational range is 360°.

3. The method according to claim 1, wherein the first angular velocity and/or the second angular velocity are constant.

4. The method according to claim 1, wherein the first axis of rotation is coincident with the second axis of rotation.

5. The method according to claim 1, wherein the first axis of rotation is parallel to, but displaced from the second axis of rotation.

6. The method according to claim 1, further comprising:
    rotating a second diffractive or refractive optical element at a third angular velocity about a third axis of rotation, wherein the second diffractive or refractive optical element is located between the first diffractive or refractive optical element and the scanning mirror and the emission beam path passes through the second diffractive or refractive optical element before being incident upon the scanning mirror.

7. The method according to claim 6, wherein the third angular velocity is constant.

8. The method according to claim 6, wherein the third axis of rotation is coincident with the first axis or rotation and/or the second axis of rotation.

9. The method according to claim 6, wherein the third axis of rotation is parallel to, but displaced from, the first axis of rotation and/or the second axis of rotation.

10. The method according to claim 6, wherein the first diffractive or refractive optical element is a wedge prism and the second diffractive or refractive optical element is a diffraction grating.

11. The method according to claim 1, wherein the first diffractive or refractive optical element is a wedge prism.

12. The method according to claim 1, wherein the first diffractive or refractive optical element is a diffraction grating.

13. The method according to claim 1, wherein the first diffractive or refractive optical element acts to deviate an incident beam by an angle from 1° to 15°.

14. The method according to claim 1, wherein the first diffractive or refractive optical element acts to deviate an incident beam by an angle from 5° to 10°.

15. The method according to claim 1, wherein the second angular velocity is at least ten times the first angular velocity.

16. The method according to claim 1, wherein the second angular velocity is less than one hundred times the first angular velocity.

17. The method according to claim 1, wherein the emission beam path is coincident with the first axis of rotation and/or the second axis of rotation.

18. The method according to claim 1, wherein the emission beam path is parallel to but displaced from the first axis of rotation and/or the second axis of rotation.

19. The method according to claim 1, further comprising a plurality of stationary laser sources each controlled to emit light along an emission beam path that passes through the first diffractive or refractive optical element before being incident upon the scanning mirror in order to reflect said light onto a scanning beam path.

20. The method according to claim 1, wherein the angled scanning mirror is a 45° mirror.

21. The method according to claim 1, wherein the emission beam path is at an angle to the first axis of rotation.

* * * * *